United States Patent
Qu et al.

(10) Patent No.: US 7,489,060 B2
(45) Date of Patent: Feb. 10, 2009

(54) SUPERCONDUCTING ROTATING MACHINES WITH STATIONARY FIELD COILS

(75) Inventors: Ronghai Qu, Clifton Park, NY (US); James William Bray, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 344 days.

(21) Appl. No.: 11/479,700

(22) Filed: Jun. 30, 2006

(65) Prior Publication Data

US 2008/0001491 A1    Jan. 3, 2008

(51) Int. Cl.
*H02K 31/00*    (2006.01)
(52) U.S. Cl. .................. 310/178; 310/168; 310/268
(58) Field of Classification Search ............ 310/179, 310/166, 168, 268, 178, 180
See application file for complete search history.

(56) References Cited

U.S. PATENT DOCUMENTS

| | | | |
|---|---|---|---|
| 4,001,617 A | 1/1977 | Boyer | |
| 4,031,421 A | 6/1977 | Geiger | |
| 4,499,392 A | 2/1985 | Giacoletto | |
| 4,816,709 A * | 3/1989 | Weldon | 310/178 |
| 5,057,726 A | 10/1991 | Mole et al. | |
| 5,177,387 A | 1/1993 | McMichael et al. | |
| 5,710,476 A * | 1/1998 | Ampela | 310/268 |
| 5,831,362 A | 11/1998 | Chu et al. | |
| 5,982,070 A * | 11/1999 | Caamano | 310/216 |
| 6,100,620 A | 8/2000 | Radovsky | |
| 6,445,105 B1 | 9/2002 | Kliman et al. | |
| 6,531,799 B1 | 3/2003 | Miller | |
| 6,737,777 B2 | 5/2004 | Werfel et al. | |
| 6,750,588 B1 * | 6/2004 | Gabrys | 310/268 |
| 6,794,783 B2 | 9/2004 | Tu et al. | |
| 6,803,691 B2 | 10/2004 | Rose | |
| 6,809,453 B2 | 10/2004 | Narita et al. | |

(Continued)

FOREIGN PATENT DOCUMENTS

GB    2091950    8/1980

(Continued)

OTHER PUBLICATIONS

"Development of World's First Practical-Level Liquid Nitrogen-Cooled Superconductor Motor," Jan. 20, 2005, 4 pages.

*Primary Examiner*—Michael C Zarroli
(74) *Attorney, Agent, or Firm*—Penny A. Clarke (57) ABSTRACT

A machine includes a shaft adapted to rotate about a longitudinal axis and formed of a magnetic material and a rotor assembly rotationally engaged with the shaft The rotor assembly includes a pair of rotor disks comprising a magnetic material, each of the rotor disks having a number of magnetic poles, the magnetic poles being spaced apart circumferentially. The rotor disks are coupled to the shaft for rotation about the shaft and generation of a rotating permeance wave. The machine further includes a stator assembly that includes a magnetic core stator disposed between the rotor disks, a number of armature windings supported on the magnetic core stator, and a stationary superconducting field coil disposed between the magnetic core stator and the shaft. The stationary superconducting field coil is configured as a stationary magneto-motive force (MMF) source for the rotating permeance wave produced by the rotor assembly to produce a rotating magnetic field.

26 Claims, 10 Drawing Sheets

U.S. PATENT DOCUMENTS

| | | |
|---|---|---|
| 6,924,574 B2 * | 8/2005 | Qu et al. .................... 310/114 |
| 7,049,724 B2 | 5/2006 | Qu et al. |
| 7,207,178 B2 | 4/2007 | Steinmeyer |
| 2004/0212258 A1 | 10/2004 | Laskaris et al. |
| 2004/0239201 A1 | 12/2004 | Sivasubramaniam et al. |
| 2006/0028085 A1 | 2/2006 | Qu et al. |
| 2006/0066110 A1 | 3/2006 | Jansen et al. |
| 2006/0071575 A1 | 4/2006 | Jansen et al. |
| 2008/0007132 A1 | 1/2008 | Weeber et al. |

FOREIGN PATENT DOCUMENTS

| | | |
|---|---|---|
| GB | 2087165 | 5/1982 |
| JP | 64-26341 | 1/1989 |
| JP | 3289344 | 12/1991 |
| JP | 11-113241 | 4/1999 |
| JP | 2001091642 | 4/2001 |

* cited by examiner

SUPERCONDUCTING ROTATING MACHINES WITH STATIONARY FIELD COILS

STATEMENT REGARDING FEDERALLY SPONSORED RESEARCH & DEVELOPMENT

This invention was made with Government support under contract number FA8650-04-G-2466-001 awarded by the United States Air Force (USAF). The Government has certain rights in the invention.

BACKGROUND OF THE INVENTION

The present invention relates generally to electrical motor/generators, and more particularly to machines including superconducting windings.

Typically, designs for superconducting electric machines include a superconducting field coil installed on the rotor. The superconducting coil is maintained at a temperature below its critical temperature using a continuous supply of cryogenic fluid, such as liquid helium (He) for conventional superconductors and liquid nitrogen ($N_2$) or neon (Ne) for high temperature superconductors (HTS). In order to cool the field coil, the cryogenic fluid is typically supplied to the superconducting field coil from a stationary cryocooler through a transfer coupling that is coupled to one end of the rotor. The transfer coupling channels the cryogenic fluid from a stationary portion to a rotating portion of the rotor. The cryogenic fluid is then routed through a cooling loop thermally coupled to the superconducting field coil and then back to the transfer coupling for return to the stationary cryocooler. This transfer of cryogenic fluid from a stationary cryocooler to a rotating cooling loop adds considerable complexity to the overall system design.

In addition, installation of a superconducting field coil on the rotor subjects the superconducting field coil to substantial thermal stresses, centrifugal stresses, and electrical design challenges. One such electrical design challenge is providing an electrical connection through the rotor to power the superconducting field coil. Accordingly, designing, fabricating and operating such a rotor may be difficult. For example, the superconducting coils, especially HTS coils, may be sensitive to mechanical strain. Specifically, because the coils are coupled to the rotor, the coils may be subjected to centrifugal forces that may cause strains and degrade the performance of the superconductor. In addition, because the coil is maintained at a cryogenic temperature, an elaborate support system may be needed to maintain the coil in position against the centrifugal forces while preserving the integrity of the thermal insulation between the coil and the parts of the rotor at ambient temperature.

To overcome these issues, a radial flux homopolar inductor alternator (HIA) machine has been proposed, as described in commonly assigned U.S. patent application Ser. No. 10/444,253, filed May 21, 2003, titled "METHODS AND APPARATUS FOR ASSEMBLING HOMOPOLAR INDUCTOR ALTERNATORS INCLUDING SUPERCONDUCTING WINDINGS." More recently, an axial-flux superconducting machine structure employing stationary field coils was disclosed in U.S. Pat. No. 7,049,724, titled "SUPERCONDUCTING ROTATING MACHINES WITH STATIONARY FIELD COILS AND AXIAL AIRGAP FLUX." By attaching the superconducting field coil to the stator, these designs overcome the above-discussed problems presented by superconducting machines employing field coils installed on the rotor. Advantages of the axial-flux stationary superconducting field coil structure over the radial flux design include improved torque density and more effective use of machine volume, by virtue of the higher ratio of airgap to machine volume. However, the relatively small usable airgap is a design challenge presented by the radial flux HIA design. The axial-flux stationary superconducting field coil structure employs a split stator, which adds to the complexity of the machine.

Accordingly, it is desirable to provide a machine with improved performance characteristics, such as increased torque density, increased reliability, less-complex designs, improved manufacturability, and better field coil positions.

BRIEF DESCRIPTION OF THE INVENTION

One aspect of the invention resides in a machine, such as a motor or a generator, that includes a shaft adapted to rotate about a longitudinal axis of the shaft. The shaft is formed from a magnetic material. The machine further includes a rotor assembly rotationally engaged with the shaft. The rotor assembly includes a pair of rotor disks comprising a magnetic material. Each of the rotor disks has a number of magnetic poles. The magnetic poles are spaced apart circumferentially, and the rotor disks are coupled to the shaft for rotation about the shaft and generation of a rotating permeance wave. The machine further includes a stator assembly comprising a number of armature windings, disposed between the rotor disks and defining an air core stator, and a stationary superconducting field coil disposed between the air core stator and the shaft. The stationary superconducting field coil is configured as a stationary magneto-motive force (MMF) source for the rotating permeance wave produced by the rotor assembly to produce a rotating magnetic field.

Another aspect of the invention resides in a machine such as a motor or a generator, that includes a shaft adapted to rotate about a longitudinal axis of the shaft, the shaft being formed of a magnetic material. The machine further includes a rotor assembly rotationally engaged with the shaft, the rotor assembly including a pair of rotor disks comprising a magnetic material. Each of the rotor disks has a number of magnetic poles, the magnetic poles being spaced apart circumferentially. The rotor disks are coupled to the shaft for rotation about the shaft and generation of a rotating permeance wave. The machine further includes a stator assembly that includes a magnetic core stator disposed between the rotor disks, a number of armature windings supported on the magnetic core stator, and a stationary superconducting field coil disposed between the magnetic core stator and the shaft. The stationary superconducting field coil is configured as a stationary magneto-motive force (MMF) source for the rotating permeance wave produced by the rotor assembly to produce a rotating magnetic field.

Yet another aspect of the invention resides in a machine, such as a motor or a generator, that includes a shaft adapted to rotate about a longitudinal axis of the shaft, the shaft being formed of a non-magnetic material. The machine further includes a rotor assembly rotationally engaged with the shaft, the rotor assembly including a pair of rotor disks comprising a magnetic material. Each of the rotor disks has a number of magnetic poles, and the magnetic poles are spaced apart circumferentially. The rotor disks are coupled to the shaft for rotation about the shaft and generation of a rotating permeance wave. The machine further includes a stator assembly that includes a number of armature windings disposed between the rotor disks and defining an air core stator, a stator yoke comprising a magnetic material, and a stationary superconducting field coil disposed between the air core stator and the stator yoke. The stationary superconducting field coil is configured as a stationary magneto-motive force (MMF) source for the rotating permeance wave produced by the rotor assembly to produce a rotating magnetic field.

Still yet another aspect of the invention resides in a machine, such as a motor or a generator, that includes a shaft adapted to rotate about a longitudinal axis of the shaft, the shaft being formed of a non-magnetic material. The machine includes a rotor assembly rotationally engaged with the shaft. The rotor assembly includes a pair of rotor disks comprising a magnetic material. Each of the rotor disks has a number of magnetic poles, the magnetic poles being spaced apart circumferentially. The rotor disks is coupled to the shaft for rotation about the shaft and generation of a rotating permeance wave. The machine further includes a stator assembly that includes a magnetic core stator disposed between the rotor disks, a number of armature windings supported on the magnetic core stator, a stator yoke comprising a magnetic material, and a stationary superconducting field coil disposed between the magnetic core stator and the stator yoke. The stationary superconducting field coil is configured as a stationary magneto-motive force (MMF) source for the rotating permeance wave produced by the rotor assembly to produce a rotating magnetic field.

DETAILED DESCRIPTION OF THE INVENTION

Figure 1:
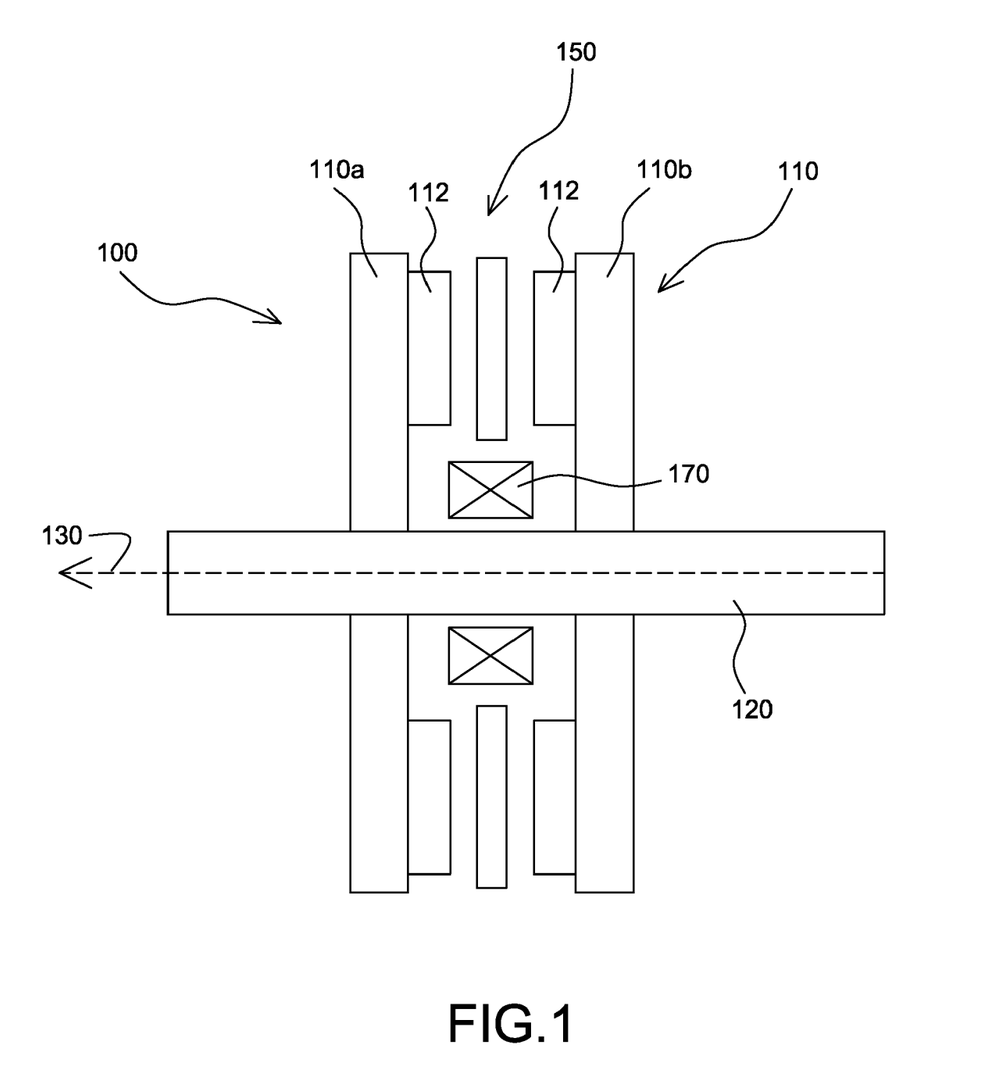
FIG. 1 is a cross-sectional view of an exemplary embodiment of a synchronous machine employing an air core stator.

FIG. 1 is a cross-sectional view of an exemplary embodiment of an electrical machine 100. The machine 100 may operate as a motor and/or as a generator as desired. As shown, the machine 100 includes a shaft 120 adapted to rotate about a longitudinal axis 130 of the shaft. For the exemplary embodiment shown in FIG. 1, the shaft 120 is formed of a magnetic material. For particular embodiments, the magnetic material employed in the shaft 120 is characterized by a high saturation magnetization, for example above 1.7 Tesla, more particularly above 1.8 Tesla and still more particularly about 2.3 Tesla. Example magnetic materials for the shaft include, but are not limited to, iron-cobalt alloys. As used herein, iron-cobalt alloys may include other constituents, for example to strengthen the alloy. The invention is not limited to a specific shaft construction, and non-limiting examples of the shaft include monolithic constructions and dual or multi-alloy constructions. As discussed below, by using superconducting field coils 170, relatively high magnetic flux levels can be achieved. However, the magnetization value for the shaft 120 limits the peak magnetic field that can be used. Accordingly, it is desirable to form the shaft of high saturation magnetization magnetic material(s) in order to enable the shaft to convey high levels of magnetic flux.

The machine 100 includes a rotor assembly 110 rotationally engaged with the shaft 120 and having a pair of rotor disks 110*a*, 110*b* formed of a magnetic material. The saturation magnetization of the magnetic material in the rotor disks is less critical than that of the shaft material. Accordingly, a wide variety of magnetic materials can be used to form the rotor disks, non-limiting examples of which include magnetic steel, iron-cobalt alloys, and silicon iron. In addition, the disks could comprise laminated structures to reduce eddy current losses from the changing magnetic fields. The specific material selected will depend upon the strength, weight and cost requirements for the application. Each of the rotor disks 110*a*, 110*b* has a number of magnetic poles 112, which are spaced apart circumferentially. The poles are formed on a planar surface that is substantially perpendicular to the rotational axis of the rotor assembly. The rotor disks 110*a*, 110*b* are coupled to the shaft 120 for rotation about the shaft 120 and generation of a rotating permeance wave. Embodiments of the rotor disks are described in detail below with reference to FIGS. 2-4.

Figure 5:
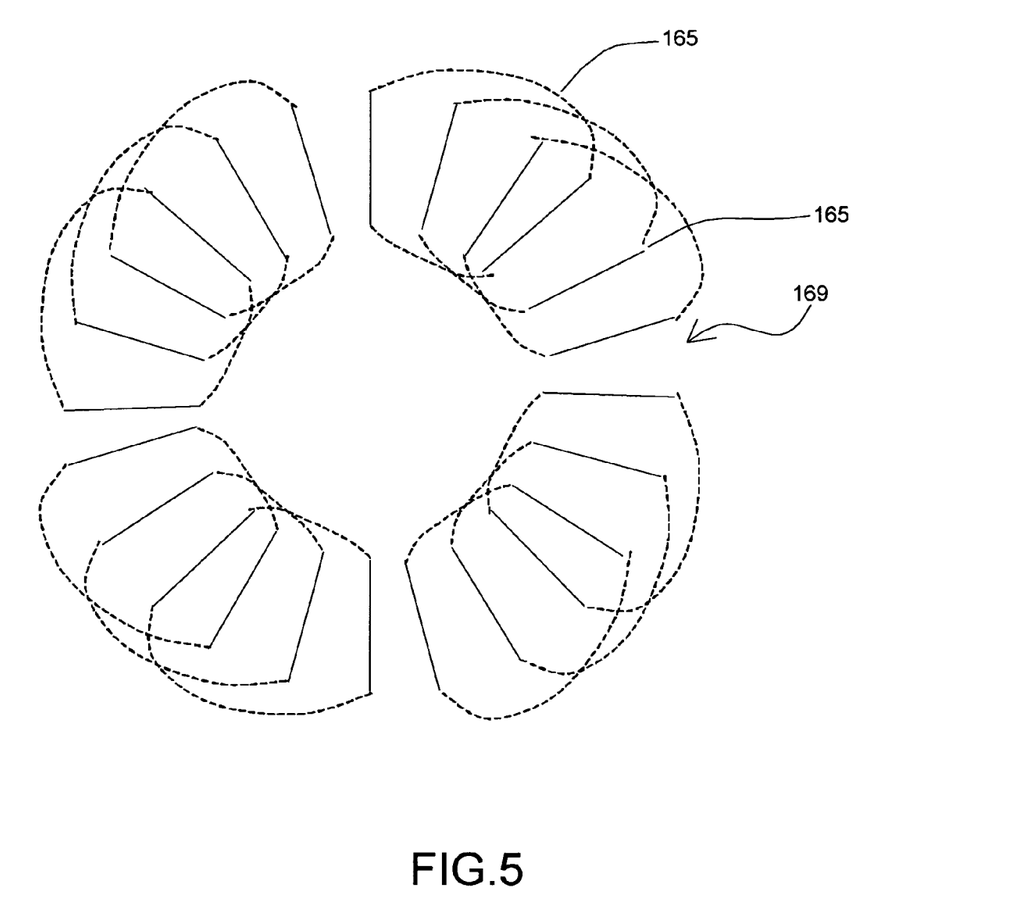
FIG. 5 illustrates an exemplary configuration for an armature winding.

The machine 100 further includes a stator assembly 150 having a number of armature windings (stator windings) 165 disposed between the rotor disks and defining an air core stator 169, as shown for example in FIG. 5. The stator windings 165 may be formed of conventional or superconducting materials. One example air-core stator assembly is shown in FIG. 5, and beneficially air-core stators are lighter than standard iron cores and have less eddy current loss. For particular embodiments, the structural support material for the air-core stator is non-electrically conducting where possible to reduce eddy current losses. The single stator design shown in FIG. 1 is less complex and more cost effective than the two-stator structure employed in U.S. patent application Ser. No. 10/792,503.

For the exemplary embodiment shown in FIG. 1, a stationary superconducting field coil 170 is disposed between the air core stator and the shaft. In operation, the stationary superconducting field coil is configured as a stationary magneto-motive force (MMF) source for the rotating permeance wave produced by the rotor assembly to produce a rotating magnetic field. More particularly, the rotating magnetic field is a direct current (DC) field that has an alternating current (AC) effect on the stator windings due to flux pulsation. Beneficially, by positioning the stationary superconducting field coil 170 in the stator assembly, the stationary superconducting field coil 170 is mechanically decoupled from the rotor assembly 110. The field coil 170 and the magnetic poles 112 are configured relative to each other such that a rotating magnetic field with a substantially axial airgap flux is produced when the rotor segments 110*a*, 110*b* are rotated related relative to the stator assembly 150 around a predetermined axis 130.

By forming the stationary field coil 170 from a superconducting material, the stationary field coil 170 exhibits substantially zero resistance to electrical current flow when cooled to superconducting temperatures. Beneficially, by using superconducting field coils, higher flux levels can be achieved, than with conventional copper coils. For example, peak fields of at least about 1.5 Tesla, and more particularly of at least about 2 Tesla can be achieved, where the peak field corresponds to the highest value of the magnetic field in the machine. In one embodiment, the field coil 170 comprises a low temperature superconductor (LTS), non-limiting examples of which include Niobium Titanium (NbTi), which is a type II superconductor with a critical temperature of 9 Kelvin and a critical magnetic field of 11 Tesla. The superconducting stationary field coil 170 is maintained at a temperature below the critical temperature of the superconducting material forming the coil 170. For example, a LTS field coil 170 may be maintained at a temperature approaching four degrees Kelvin using a continuous supply of cryogenic fluid, such as, for example, but not limited to liquid helium (He). If a high temperature superconductor (HTS) is used in fabricating the field coil, a cryogenic fluid such as nitrogen ($N_2$) or neon (Ne) may be used to achieve superconducting temperatures. Non-limiting examples of HTS materials include yttrium barium copper oxide (YBCO), bismuth strontium copper oxides (BSCCO) and magnesium diboride ($MgB_2$). The cryogenic fluid is typically supplied to the superconducting field coil from a stationary cryocooler. Any suitable cooling fluid devices, such as cooling fluid tubes or conduits may be provided in the stator assembly 150 to cool the superconducting field coil 170. Cooling by conduction through thermally conducting materials is also possible.

In operation, the machine 100 may operate as an electrical generator or as a motor. When the machine 100 operates as a generator, the shaft 120 and the rotor assembly 110 are rotated about the longitudinal axis 130 of the shaft 120. The rotation of the shaft 120 and the rotor assembly 110 may be performed by applying a torsional force coupled to the shaft 120. The superconducting coil 170 is cooled to a temperature below its critical temperature $T_c$, and a DC electrical current is supplied to the stationary superconducting field coil 170 and the coil-170 acts as a stationary magnetomotive force (MMF) source, which interacts with a rotating permeance wave of the rotating poles of the rotor to produce a rotating magnetic field. The rotating magnetic field has an air gap flux directed substantially axially along the longitudinal axis 130 of the shaft 120 and is magnetically coupled to the stator windings 165 which generates electrical power. When the machine 100 operates as a motor, electrical power is provided to the machine 100 to generate the rotating magnetic field and to cause the rotor assembly 110 to rotate relative to the stator assembly, which in turn rotates the shaft 120.

Armature windings 165 may be formed of conventional materials, such as copper, or may comprise superconducting windings. In one embodiment, the armature windings 165 comprise a low temperature superconductor (LTS), non-limiting examples of which include NbTi. In other embodiments, armature windings 165 comprise HTS materials, non-limiting examples of which include YBCO, BSCCO and $MgB_2$. For embodiments employing superconducting armature windings 165, the armature windings 165 are maintained at temperatures below the critical temperature of the superconducting material forming the windings 165. For example, LTS armature windings 165 may be maintained at a temperature approaching four degrees Kelvin using a continuous supply of cryogenic fluid, such as, for example, but not limited to, liquid helium (He). If, a high temperature superconductor (HTS) is used in fabricating the armature coil coil, a cryogenic fluid such as nitrogen ($N_2$) or Neon (Ne) may be used to achieve superconducting temperatures. The cryogenic fluid is typically supplied to the superconducting armature coils from a stationary cryocooler. Any suitable cooling fluid devices, such as cooling fluid tubes or conduits may be provided in the stator assembly 150 to cool the superconducting coils 165.

As shown in FIG. 1, the rotor segments 110a and 110b comprising magnetic poles 112 and non-magnetic poles (or spacings) 114 are located axially on either side of the armature winding 165. A number of such rotor/stator arrangements can be stacked axially along the shaft 120 for long machines.

Figure 2:
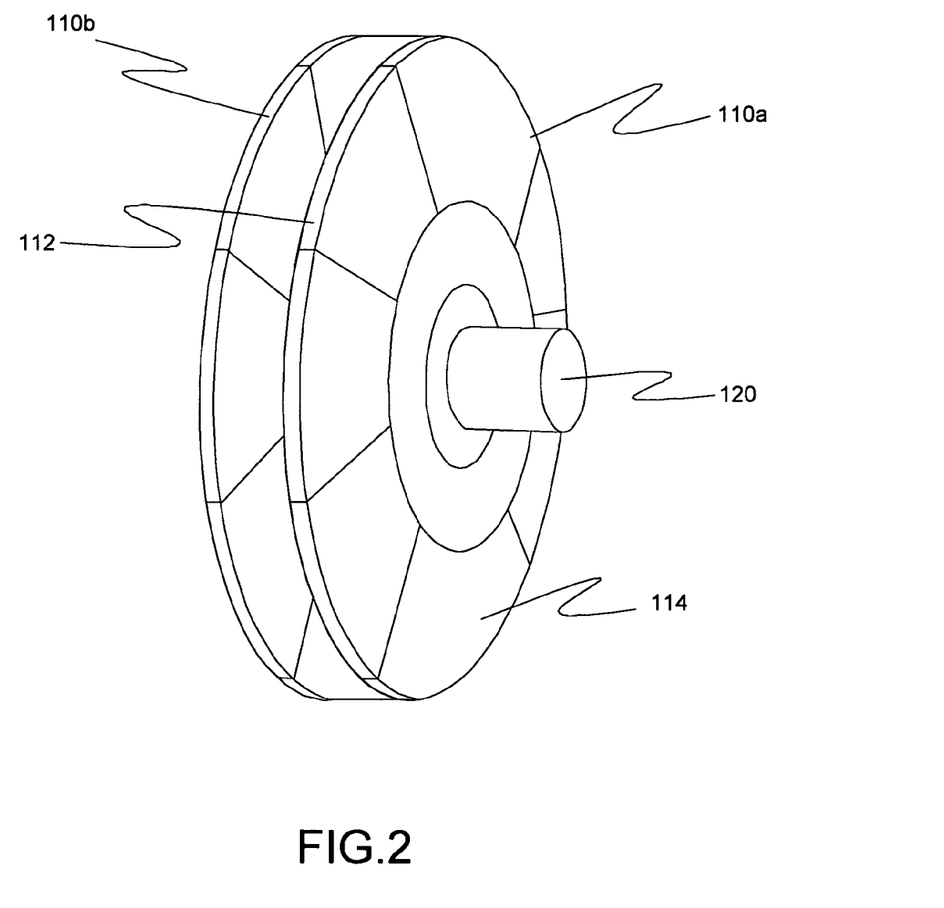
FIG. 2 is a perspective view of an exemplary embodiment of a rotor assembly for the machine shown in FIG. 1.

FIG. 2 is a three dimensional view of an exemplary rotor assembly 110 mounted on a shaft 120. For the exemplary embodiment depicted in FIG. 2, the rotor assembly contains two rotor disks. As illustrated in FIG. 2, the rotor assembly 110 is formed by placing two similar rotor disks 110a, 110b in an axially spaced-apart configuration. The rotor disks 110a, 110b are sufficiently separated to allow an armature winding to reside therebetween.

Figure 3:
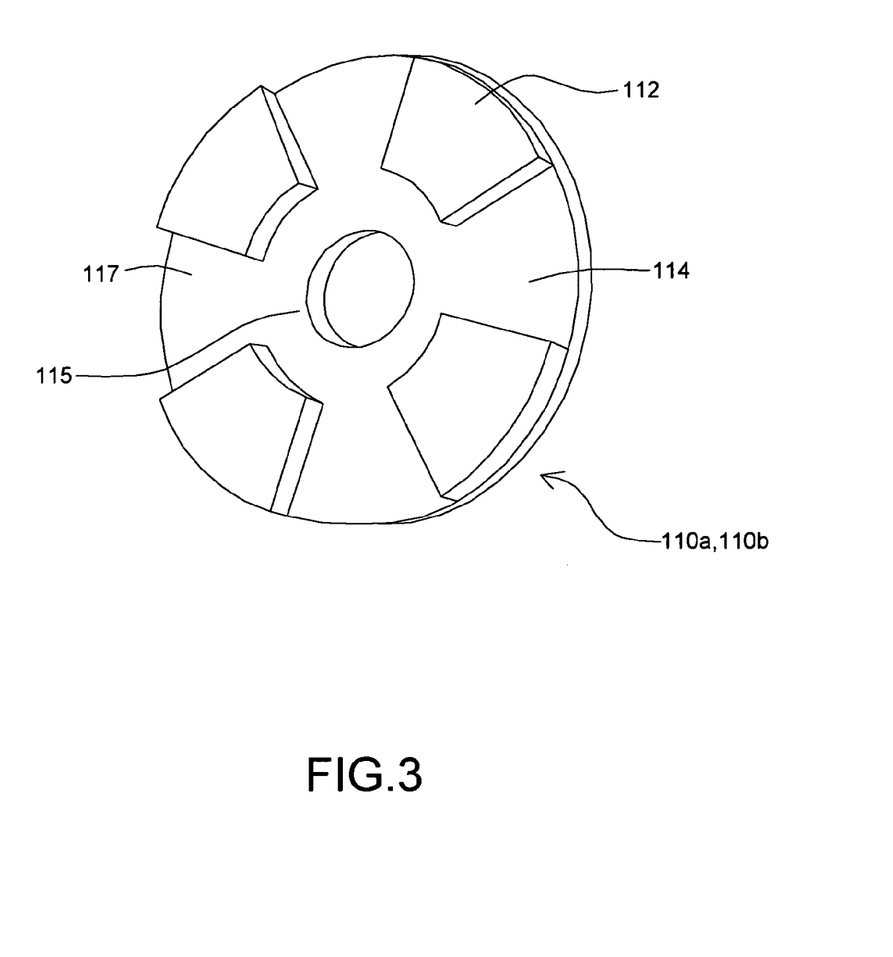
FIG. 3 illustrates an exemplary embodiment of a rotor disk for the machine shown in FIGS. 1, 6, 7 and 8.
Figure 6:
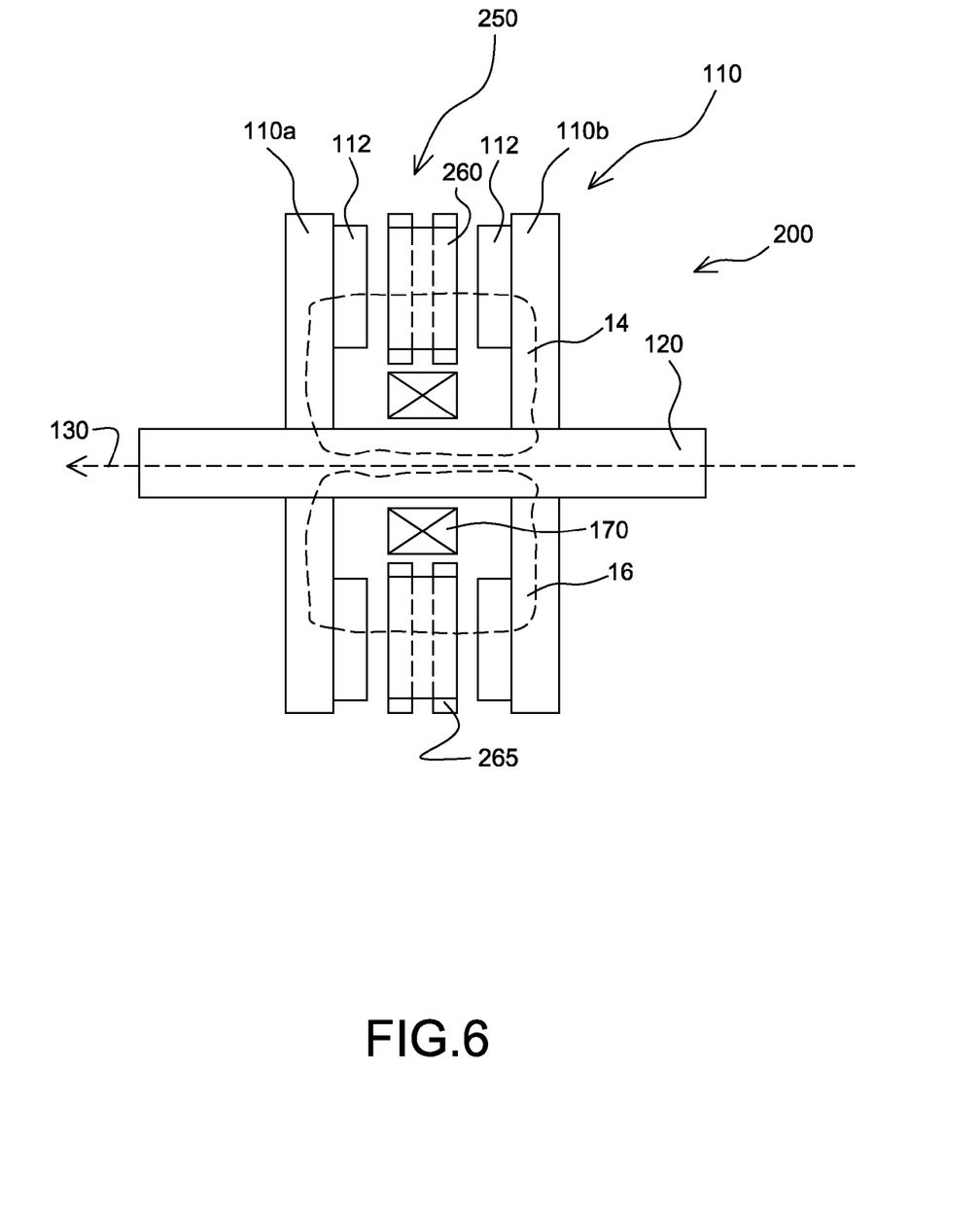
FIG. 6 is a cross-sectional view of another exemplary embodiment of a synchronous machine employing a magnetic stator core.
Figure 7:
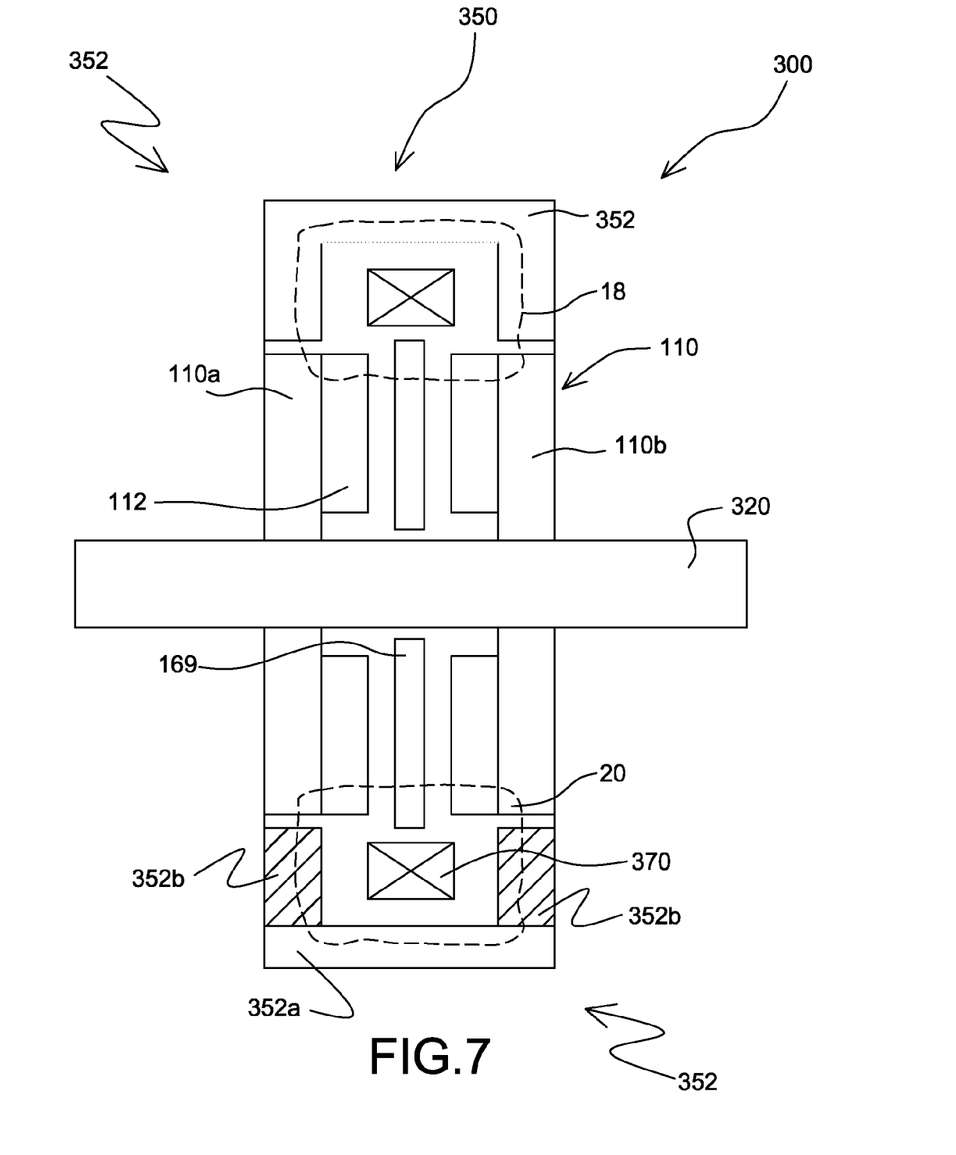
FIG. 7 is a cross-sectional view of another exemplary embodiment of a synchronous machine employing an air core stator.
Figure 8:
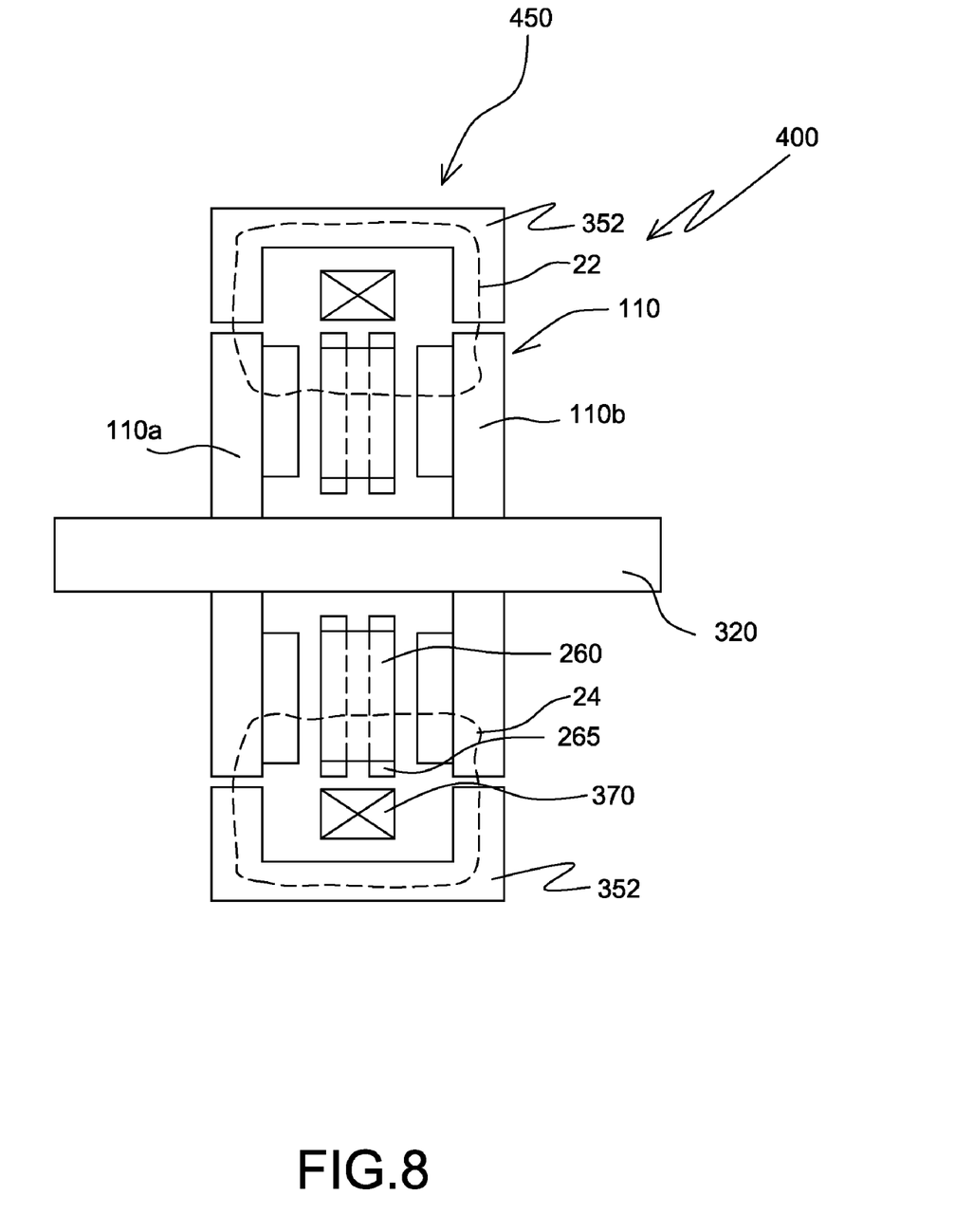
FIG. 8 is a cross-sectional view of another exemplary embodiment of a synchronous machine employing a magnetic stator core.

FIG. 3 depicts an exemplary rotor disk that may be used with machine 100 of FIG. 1, as well as with machine 200 of FIG. 6, machine 300 of FIG. 7 and machine 400 of FIG. 8. The rotor disk 110 includes an inner portion 115 for engaging the shaft 120 (see FIG. 1). This inner portion 115 may be adapted to accommodate fixtures or adapters, which secure the rotor disk to the shaft. For the exemplary embodiment illustrated in FIG. 3, rotor disk 110 further includes an outer portion 117 formed of a magnetic material, for example a ferromagnetic material, to allow magnetic flux to travel therewithin. For the exemplary embodiment illustrated in FIG. 3, outer portion 117 is provided with a number of spaced-apart, magnetic poles 112 formed on a surface thereof. According to a particular embodiment, the magnetic poles 112 are ferromagnetic poles. In one example, the ferromagnetic poles 112 are formed with iron plates mounted on the surface of the outer portion 117. In another embodiment, the magnetic poles 112 are formed of laminated iron. For the exemplary arrangement of FIG. 3, space between the magnetic poles 112 forms non-magnetic spaces or regions 114. For particular embodiments, disks 110a and 110b contain the same number of magnetic poles 112. More particularly, the magnetic poles on the two disks are aligned together. Benefits of the rotor disk configuration of FIG. 3 include ease and cost of manufacture.

Figure 4:
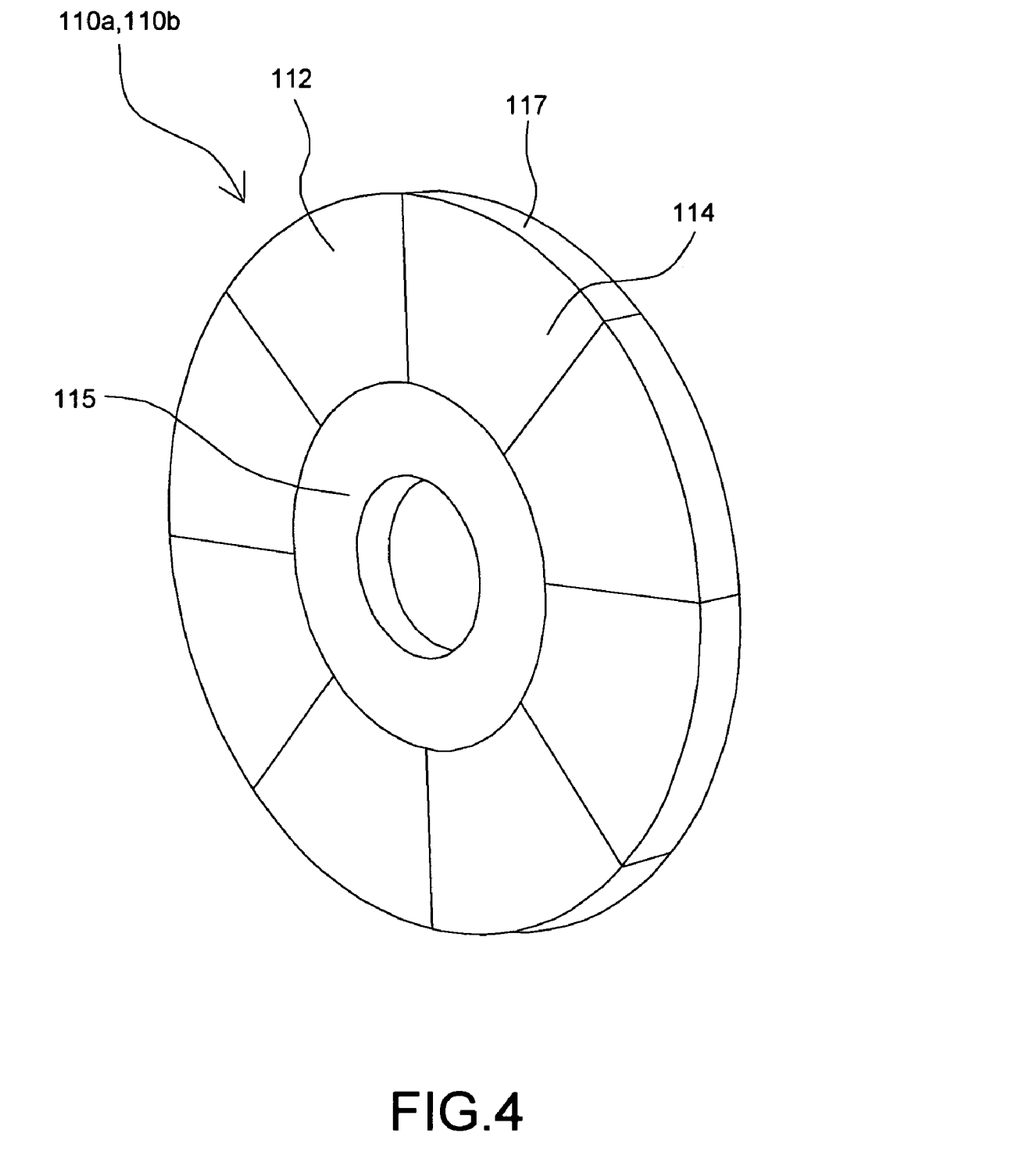
FIG. 4 illustrates a second exemplary embodiment of a rotor for the machine shown in FIGS. 1, 6, 7 and 8.

FIG. 4 illustrates another exemplary embodiment of rotor disk 110. For the exemplary embodiment illustrated by FIG. 4, the rotor disk 110 includes an inner portion 115 and an outer portion 117. The outer portion includes alternately spaced magnetic poles 112 and non-magnetic spaces or regions 114. The magnetic poles are formed of a magnetic material, non-limiting examples of which include iron-cobalt alloys and magnetic steel, and the non-magnetic regions 114 are formed of a non-magnetic material, non-limiting examples of which include non-magnetic stainless steel, aluminum and alloys thereof, titanium and alloys thereof, composite materials and graphite. Beneficially, the rotor disk configuration of FIG. 4 reduces the flux path by virtue of its compact design. Accordingly, this rotor disk configuration reduces the leakage flux, thereby increasing the efficiency of the machine.

FIG. 5 depicts an exemplary configuration for the armature windings 165 for the machine described above with reference to FIG. 1. For the exemplary configuration shown in FIG. 5, armature winding 165 is wound to define an air core stator 169. For particular embodiments, the support structure for the winding is formed using non-magnetic, non-electrically conductive materials, non-limiting examples of which include epoxies. The armature winding configurations shown in FIG. 5 is illustrative and is not intended to limit the invention.

The above described machine 100 includes the benefits of the radial-flux HIA machines of U.S. patent application Ser.

No. 10/444,253, such as reliability, increased efficiency and lower weight and size, relative to conventional machines. In addition, machine 100 provides a higher torque density and lower weight relative to the radial-flux HIA machines. Compared with the axial-flux superconducting machine structure of U.S. Pat. No. 7,049,724, the machine 100 of the present invention provides a less complex design, in that it includes a single stator, and provides better field coil positions.

FIG. 6 is a cross-sectional view of another exemplary embodiment of an electrical machine 200. The machine 200 may operate as a motor and/or as a generator as desired. Many of the components of machine 200 are similar to those of machine 100, and common reference numerals are used to denote such components. As shown, the machine 200 includes a shaft 120 adapted to rotate about a longitudinal axis 130 of the shaft. The shaft 120 is formed of a magnetic material. The machine 200 further includes a rotor assembly 110 rotationally engaged with the shaft 120. An example rotor assembly 110 is discussed above with reference to FIG. 2. For the exemplary embodiment shown in FIG. 6, the rotor assembly includes a pair of rotor disks 110a, 110b formed of a magnetic material. Each of the rotor disks has a number of magnetic poles 112, which are spaced apart circumferentially. The rotor disks are coupled to the shaft for rotation about the shaft and generation of a rotating permeance wave. The magnetic poles 112 may be separated by spacings or non-magnetic material regions 114, and the rotor disks may take the form of the exemplary rotor disks shown in FIGS. 3 and 4, for example.

Figure 9:
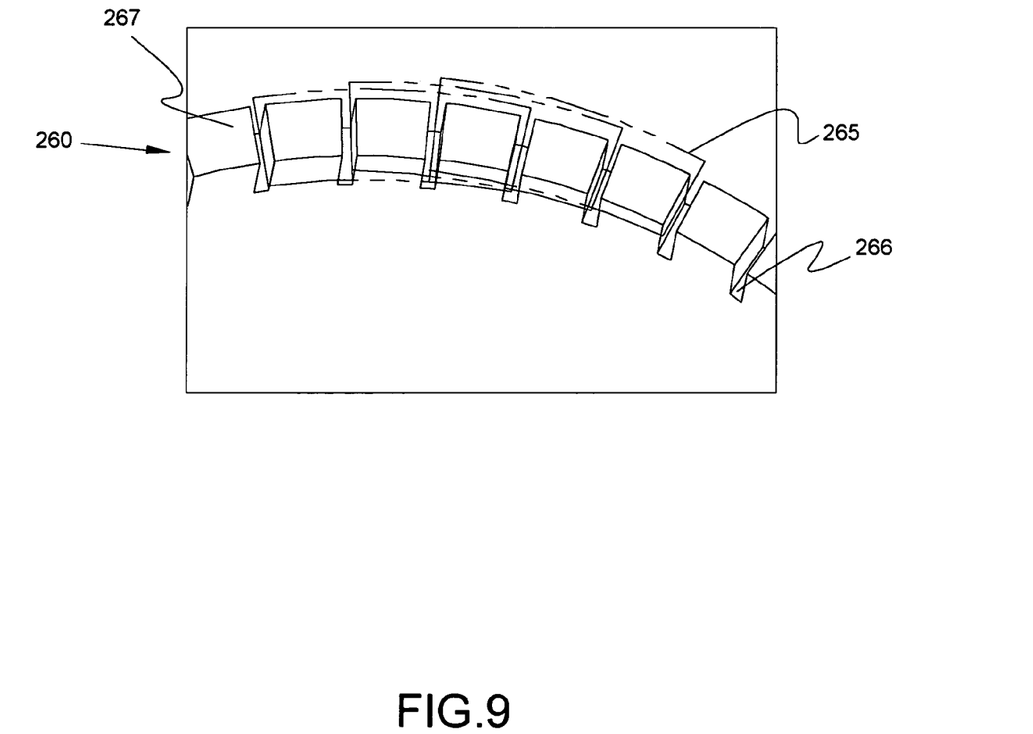
FIG. 9 illustrates an exemplary configuration for an armature winding.

As shown in FIG. 6, the machine 200 further includes a stator assembly 250 having a magnetic core stator 260 disposed between the rotor disks 110a, 110b. The stator assembly 250 further includes armature windings 265 supported on the magnetic core stator 260, and a stationary superconducting field coil 170 disposed between the magnetic core stator 260 and the shaft 120, as indicated in FIG. 6. FIG. 9 illustrates an exemplary multi-phase configuration for an armature winding. For the exemplary arrangement of FIG. 9, the armature windings are arranged to form a set of multiple phase windings. More particularly, the magnetic stator core 260 defines a number of slots 266 disposed between teeth 267, and the armature windings 265 are arranged in the slots to form the multiple phase windings. For the particular arrangement shown in FIG. 9, stator coils 265 are wound around three (3) stator teeth 267. This example configuration is purely illustrative, and other winding configurations may be employed. The magnetic core stator 260 is particularly beneficial for use with superconducting armature windings 265. In particular, the use of the magnetic support structure for the armature reduces the field impinging on the armature coil. Because the AC-loss properties of superconductors are relatively poor at high field levels (for example at or above about 2 Tesla), this reduction of the magnetic field at the armature windings reduces the AC losses of the armature windings 265.

In operation, the stationary superconducting field coil is configured as a stationary magneto-motive force (MMF) source for the rotating permeance wave produced by the rotor assembly to produce a rotating magnetic field. As indicated by the dashed line in FIG. 6, the rotating magnetic field is characterized by a flux loop (14, 16) that extends along the shaft 120, along the rotor disks 110a, 110b and across the magnetic stator core 260 to supply a time varying magnetic flux to the armature windings 265. The armature windings may comprise conventional conductors, such as copper, or may comprise superconducting windings.

Figure 10:
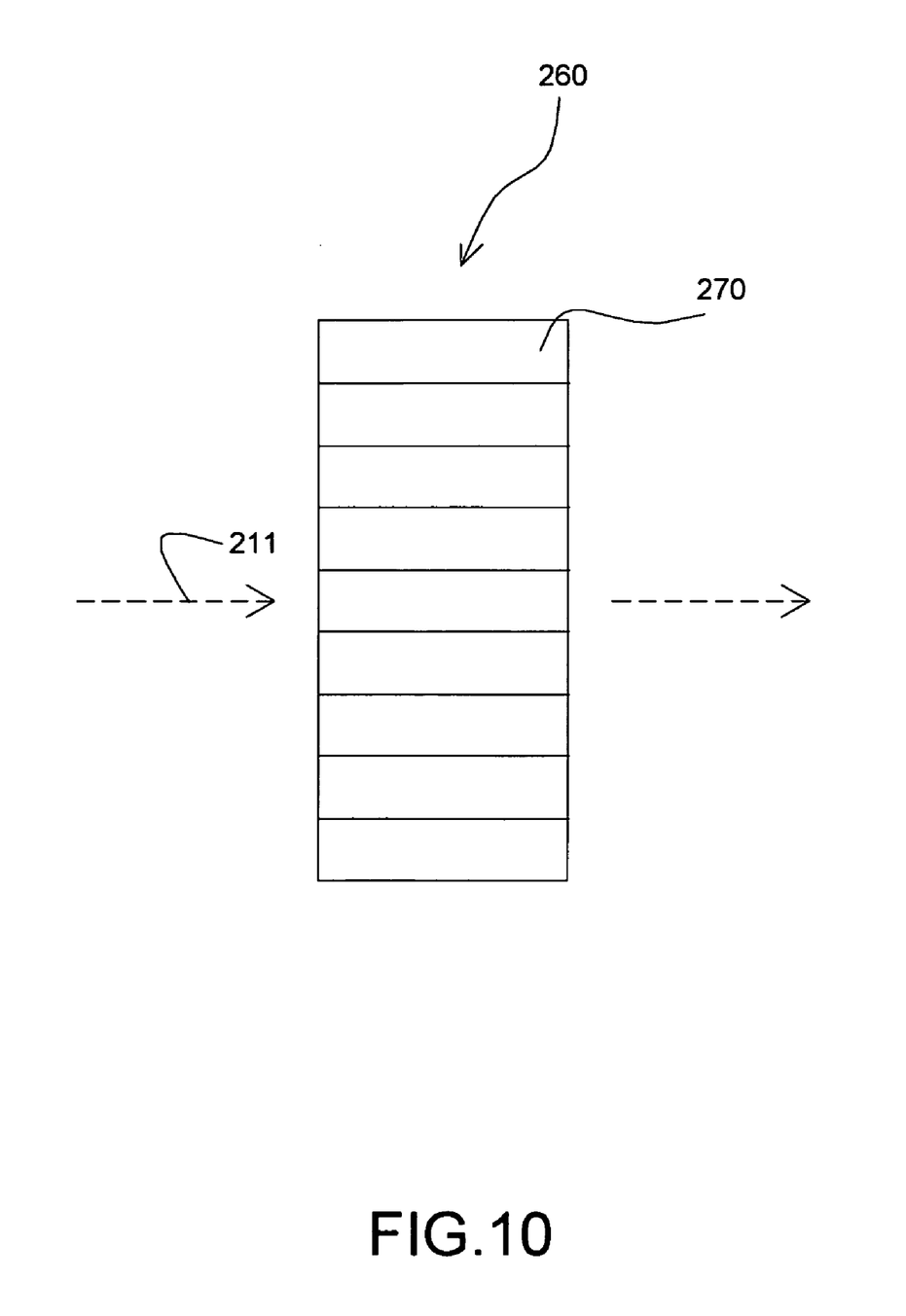
FIG. 10 schematically depicts a laminated stator core.

The illustrated embodiment for FIG. 6 has several advantages. The magnetic stator core 260 holds the armature windings 265 securely. In addition, the magnetic core stator 260 concentrates the flux optimally and away from the armature windings 265. In addition, the magnetic core stator 260 can take a large portion of the electromagnetic (EM) torques generated during machine operation, relieving the armature windings 265. Moreover, the magnetic core stator 260 provides low reluctance to the flux path, so the required field current is lower. One disadvantage is that a magnetic stator core is larger and heavier and may lead to increased eddy current losses. However, eddy current losses can be reduced by the use of laminations. In one exemplary embodiment, the magnetic stator core 260 comprises a number of laminations, for example iron laminations. FIG. 10 schematically depicts a laminated stator core 260. As indicated, the laminations 270 are parallel to the flux path 211. In one non-limiting example, the laminations comprise silicon iron, such as M19.

FIG. 7 is a cross-sectional view of another exemplary embodiment of an electrical machine 300. The machine 300 may operate as a motor and/or as a generator as desired. Many of the components of machine 300 are similar to those of machine 100 and 200, and common reference numerals are used to denote such components. As shown, the machine 300 includes a shaft 320 adapted to rotate about a longitudinal axis of the shaft. The shaft is formed of a non-magnetic material, non-limiting examples of which include aluminum and alloys thereof, stainless steel, composites, fiber-reinforced polymers, and titanium and alloys thereof. The machine 300 further includes a rotor assembly 110 rotationally engaged with the shaft 320. An example rotor assembly 110 is discussed above with reference to FIG. 2. The rotor assembly includes a pair of rotor disks 110a, 110b comprising a magnetic material. Each of the rotor disks has a number of magnetic poles 112, which are spaced apart circumferentially. The rotor disks are coupled to the shaft for rotation about the shaft and generation of a rotating permeance wave. The magnetic poles 112 may be separated by spacings or non-magnetic material regions 114, and example rotor disks are described above with reference to FIGS. 3 and 4.

The machine 300 further includes a stator assembly 350 having a number of armature windings 165 disposed between the rotor disks and defining an air core stator 169. Exemplary windings 165 defining an air-core stator 169 are shown in FIG. 5, for example. For particular embodiments, the structural support material for the air-core stator is non-electrically conducting where possible to reduce eddy current losses. The stator assembly 350 further includes a stator yoke 352 formed of a magnetic material. The saturation value of the stator yoke 352 is less critical than that of the magnetic shaft in the embodiments of FIGS. 1 and 6. Accordingly, a variety of materials can be used to form the yoke 352, non-limiting examples of which include iron, magnetic steel, and silicon iron. In one example, the cross bar portion 352a of the yoke is formed of a different material than are the legs 352b of the yoke. For example, in a particular embodiment cross-bar 352a comprises a solid material and legs 352b comprise laminates, in order to reduce AC field-induced eddy current losses in the yoke. A stationary superconducting field coil 370 is disposed between the air core stator 169 and the stator yoke 352. In operation, the stationary superconducting field coil is configured as a stationary magneto-motive force (MMF) source for the rotating permeance wave produced by the rotor assembly to produce a rotating magnetic field. As indicated by the dashed lines in FIG. 7, the rotating magnetic field is characterized by a flux loop (18, 20) that extends along the stator yoke 352, along the rotor disks 110a, 110b and across the air core stator 169 to supply a time varying magnetic flux to the armature windings 165.

FIG. 8 is a cross-sectional view of another exemplary embodiment of an electrical machine 400. The machine 400 may operate as a motor and/or as a generator as desired. Many of the components of machine 400 are similar to those of machine 100, 200 and 300, and common reference numerals are used to denote such components. As shown, the machine 400 includes a shaft 320 adapted to rotate about a longitudinal axis of the shaft. The shaft 320 is formed of a non-magnetic material, non-limiting examples of which include aluminum and alloys thereof, stainless steel, composites, fiber-reinforced polymers, and titanium and alloys thereof. A rotor assembly 110 is rotationally engaged with the shaft 320. An example rotor assembly is discussed above with reference to FIG. 2. The rotor assembly 110 includes a pair of rotor disks 110a, 110b, which are described above with reference to FIGS. 1-4.

The machine 400 further includes a stator assembly 450 having a magnetic core stator 260 disposed between the rotor disks. As shown, for example, in FIG. 9, armature windings 265 are supported on the magnetic core stator 260. Stator assembly 450 further includes a stator yoke 352 formed of a magnetic material. A stationary superconducting field coil 370 is disposed between the magnetic core stator 260 and the stator yoke 352. In operation, the stationary superconducting field coil 370 is configured as a stationary magneto-motive force (MMF) source for the rotating permeance wave produced by the rotor assembly to produce a rotating magnetic field. As shown by the dashed lines in FIG. 8, the rotating magnetic field is characterized by a flux loop (22, 24) that extends along the stator yoke 352, along the rotor disks 110a, 110b and across the magnetic core stator 260 to supply a time varying magnetic flux to the armature windings 265.

To form long machines for embodiments 100, 200, 300 and 400, a number of the rotor/stator arrangements are stacked axially along the shaft. The synchronous machines 100, 200, 300 and 400 described above are preferably implemented with stationary superconducting field coils 170, 370. This arrangement allows the cooling fluids to be more easily supplied to the superconducting field coils. Transfer of cooling fluid from a stationary cooling system to a rotating superconducting coil is eliminated. In addition, the possibility of cooling via conduction through thermally conducting materials is gained.

Exemplary embodiments of electrical generating systems are described above in detail. The systems are not limited to the specific embodiments described herein, but rather, components of each system may be utilized independently and separately from other components described herein. Each system component can also be used in combination with other system components.

Although the invention has been described in terms of various specific embodiments, those skilled in the art will recognize that the invention can be practiced with modification within the spirit and scope of the claims.

What is claimed is:

1. A machine comprising:
    a shaft adapted to rotate about a longitudinal axis of the shaft, the shaft comprising a magnetic material;
    a rotor assembly rotationally engaged with the shaft, the rotor assembly comprising a pair of rotor disks comprising a magnetic material, each of the rotor disks comprising a plurality of magnetic poles, the magnetic poles being spaced apart circumferentially, the rotor disks being coupled to the shaft for rotation about the shaft and generation of a rotating permeance wave; and
    a stator assembly comprising a plurality of armature windings disposed between the rotor disks and defining an air core stator, and a stationary superconducting field coil disposed between the air core stator and the shaft,
    wherein the stationary superconducting field coil is configured as a stationary magneto-motive force (MMF) source for the rotating permeance wave produced by the rotor assembly to produce a rotating magnetic field.

2. The machine of claim 1, wherein the rotating magnetic field is characterized by a flux loop that extends along the shaft, along the rotor disks and across the air core stator to supply a time varying magnetic flux to the armature windings.

3. The machine of claim 2, wherein the magnetic poles are separated by air spaces.

4. The machine of claim 2, wherein each of the rotor disks further comprises a non-magnetic material forming a plurality of non-magnetic regions separating the magnetic poles.

5. The machine of claim 2, wherein the magnetic material employed in the shaft is characterized by a saturation value of at least about 1.8 Tesla.

6. The machine of claim 5, wherein the magnetic material employed in the shaft comprises an iron-cobalt alloy, and wherein the magnetic material employed in the rotor disks is selected from the group consisting of iron-cobalt alloys, magnetic steel, silicon iron and combinations thereof.

7. The machine of claim 2, wherein each of the rotor disks has the same number of magnetic poles, and wherein the magnetic poles on a first one of the rotor disks are aligned with the magnetic poles on a second one of the rotor disks.

8. The machine of claim 1, wherein the stationary superconducting field coil is configured to generate a peak field value in the machine of at least about 1.5 Tesla.

9. The machine of claim 1, wherein the armature windings comprise superconducting armature windings.

10. The machine of claim 1, further comprising a plurality of rotor and stator assemblies arranged along the shaft.

11. A machine comprising:
    a shaft adapted to rotate about a longitudinal axis of the shaft, the shaft comprising a magnetic material;
    a rotor assembly rotationally engaged with the shaft, the rotor assembly comprising a pair of rotor disks comprising a magnetic material, each of the rotor disks comprising a plurality of magnetic poles, the magnetic poles being spaced apart circumferentially, the rotor disks being coupled to the shaft for rotation about the shaft and generation of a rotating permeance wave; and
    a stator assembly comprising a magnetic core stator disposed between the rotor disks, a plurality of armature windings supported on the magnetic core stator, and a stationary superconducting field coil disposed between the magnetic core stator and the shaft,
    wherein the stationary superconducting field coil is configured as a stationary magneto-motive force (MMF) source for the rotating permeance wave produced by the rotor assembly to produce a rotating magnetic field.

12. The machine of claim 11, wherein the rotating magnetic field is characterized by a flux loop that extends along the shaft, along the rotor disks and across the magnetic stator to supply a time varying magnetic flux to the armature windings.

13. The machine of claim 12, wherein the magnetic poles are separated by air spaces.

14. The machine of claim 12, wherein each of the rotor disks further comprises a non-magnetic material forming a plurality of non-magnetic regions separating the magnetic poles.

15. The machine of claim 11, wherein the magnetic material employed in the shaft comprises an iron-cobalt alloy characterized by a saturation value of at least about 1.8 Tesla.

16. The machine of claim 11, wherein the armature windings comprise superconducting armature windings.

17. The machine of claim 11, wherein the armature windings are arranged to form a set of multiple phase windings.

18. The machine of claim 17, wherein the magnetic stator defines a plurality of slots, and wherein the armature windings are arranged in the slots to form the multiple phase windings.

19. The machine of claim 11, wherein the magnetic stator core comprises a plurality of laminations.

20. The machine of claim 11, further comprising a plurality of rotor and stator assemblies arranged along the shaft.

21. A machine comprising:
a shaft adapted to rotate about a longitudinal axis of the shaft, the shaft comprising a non-magnetic material;
a rotor assembly rotationally engaged with the shaft, the rotor assembly comprising a pair of rotor disks comprising a magnetic material, each of the rotor disks comprising a plurality of magnetic poles, the magnetic poles being spaced apart circumferentially, the rotor disks being coupled to the shaft for rotation about the shaft and generation of a rotating permeance wave; and
a stator assembly comprising a plurality of armature windings disposed between the rotor disks and defining an air core stator, a stator yoke comprising a magnetic material, and a stationary superconducting field coil disposed between the air core stator and the stator yoke,
wherein the stationary superconducting field coil is configured as a stationary magneto-motive force (MMF) source for the rotating permeance wave produced by the rotor assembly to produce a rotating magnetic field.

22. The machine of claim 21, wherein the rotating magnetic field is characterized by a flux loop that extends along the stator yoke, along the rotor disks and across the air core stator to supply a time varying magnetic flux to the armature windings.

23. The machine of claim 21, further comprising a plurality of rotor and stator assemblies arranged along the shaft.

24. A machine comprising:
a shaft adapted to rotate about a longitudinal axis of the shaft, the shaft comprising a non-magnetic material;
a rotor assembly rotationally engaged with the shaft, the rotor assembly comprising a pair of rotor disks comprising a magnetic material, each of the rotor disks comprising a plurality of magnetic poles, the magnetic poles being spaced apart circumferentially, the rotor disks being coupled to the shaft for rotation about the shaft and generation of a rotating permeance wave; and
a stator assembly comprising a magnetic core stator disposed between the rotor disks, a plurality of armature windings supported on the magnetic core stator, a stator yoke comprising a magnetic material, and a stationary superconducting field coil disposed between the magnetic core stator and the stator yoke,
wherein the stationary superconducting field coil is configured as a stationary magneto-motive force (MMF) source for the rotating permeance wave produced by the rotor assembly to produce a rotating magnetic field.

25. The machine of claim 24, wherein the rotating magnetic field is characterized by a flux loop that extends along the stator yoke, along the rotor disks and across the magnetic core stator to supply a time varying magnetic flux to the armature windings.

26. The machine of claim 24, further comprising a plurality of rotor and stator assemblies arranged along the shaft.

* * * * *